US009237556B2

(12) United States Patent
Kim (10) Patent No.: US 9,237,556 B2
(45) Date of Patent: Jan. 12, 2016

(54) METHOD OF OPERATING ACCESS POINT AND WIRELESS COMMUNICATION SYSTEM USING ACCESS POINT

(71) Applicant: Samsung Electro-Mechanics Co., Ltd., Suwon-si (KR)

(72) Inventor: Seong Yeon Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 49 days.

(21) Appl. No.: 13/718,919

(22) Filed: Dec. 18, 2012

(65) Prior Publication Data

US 2013/0163531 A1 Jun. 27, 2013

(30) Foreign Application Priority Data

Dec. 23, 2011 (KR) .................. 10-2011-0141457

(51) Int. Cl.
*H04W 72/04* (2009.01)
*H04W 88/08* (2009.01)
*H04W 72/10* (2009.01)
*H04B 7/06* (2006.01)

(52) U.S. Cl.
CPC ............. *H04W 72/04* (2013.01); *H04B 7/0602* (2013.01); *H04W 72/10* (2013.01); *H04W 88/08* (2013.01)

(58) Field of Classification Search
CPC ... H04B 7/0608; H04B 7/061; H04W 72/046; H04W 72/10; H04W 72/1242; H04W 72/1247
USPC .................. 370/252, 253, 328–338, 468
See application file for complete search history.

(56) References Cited

U.S. PATENT DOCUMENTS

| 2006/0050742 A1* | 3/2006 | Grandhi et al. ............... 370/506 |
| 2007/0135133 A1* | 6/2007 | Ishii et al. ..................... 455/453 |
| 2011/0002227 A1 | 1/2011 | Sampath et al. |
| 2011/0261899 A1* | 10/2011 | Walton et al. ................. 375/295 |

FOREIGN PATENT DOCUMENTS

| JP | 2007-096744 A | 4/2007 |
| KR | 1020050053787 A | 6/2005 |
| KR | 10-2007-0026926 A | 3/2007 |
| KR | 10-2011-0084554 | 7/2011 |

* cited by examiner

*Primary Examiner* — Pao Sinkantarakorn
(74) *Attorney, Agent, or Firm* — NSIP Law (57) ABSTRACT

Provided is a method of operating an access point and a wireless communication system using an access point. The method includes classifying the terminals according to the QoS type of a service required by each of the terminals, allocating any one antenna among the plurality of antennae to one terminal of a group of terminals having the highest order of priority according to the QoS type, among the classified groups of terminals, and selecting another antenna and terminal, which maximizes a signal to interference and noise ratio (SINR) calculated from channel information between the terminal and the antenna, among the terminals and antennae, except the allocated antenna and terminal, to allocate the antenna.

9 Claims, 5 Drawing Sheets

METHOD OF OPERATING ACCESS POINT AND WIRELESS COMMUNICATION SYSTEM USING ACCESS POINT

CROSS-REFERENCE TO RELATED APPLICATIONS

This application claims the benefit of Korean Patent Application No. 10-2011-0141457 filed with the Korea Intellectual Property Office on Dec. 23, 2011, the disclosure of which is incorporated herein by reference.

BACKGROUND OF THE INVENTION

1. Field of the Invention

The present invention relates to a method of operating an access point and a wireless communication system using an access point.

2. Description of the Related Art

An access point (AP) is a device configured to connect wireless terminals to a wired device in a computer network using standards related to WiFi, Bluetooth, and so on, which may be referred to as a wireless access point (WAP).

Such an AP, which is generally connected to a router through a wired network, can transmit date between wireless terminals such as a smart phone, a tablet PC, a computer, a printer, etc., and a wired device in a network. Here, the wireless terminals can use various services such as a voice call service, a moving picture service, a date service, etc., through the AP.

Meanwhile, one AP can be connected to a plurality of terminals through wireless communication, and the wireless communication is performed according to types of services required by the plurality of terminals in different order of priorities.

For example, an online game, a video-telephony service, a voice call service, etc., which require data transmission in real time, are primarily processed, a moving picture service which may cause buffering, etc., is secondarily processed, and then, a general data service is processed.

Characteristics of the services, which become a standard for dividing order of priorities, are referred to as quality of service (QoS).

In addition, a conventional art widely uses a carrier sense multiple access/collision avoidance (CSMA/CA) method of detecting a carrier wafer using a medium before connection to the medium, and adjusting a communication sequence based on a sensed carrier such that collision between data communication does not occur.

That is, when a certain terminal requests communication with the AP, it is determined whether another terminal is already communicating with the AP through the CSMA/CA method, and the certain terminal is on standby. Accordingly, wireless communication can be performed by differentiating a standby time, in which the corresponding terminal requires communication to the AP again, into 1 ms in the case of the service requiring data transmission in real time, 2 ms in the case of the moving picture service, and 3 ms in the case of the general data service, according to the types of QoS.

However, such a method causes an increase in standby time of users who want to use another service, and thus, a fairness problem occurs. In addition, when the data communication is distributed to improve fairness, quality in voice call and video-telephony services requiring data communication in real time may be decreased.

In order to solve the problem, a technique employing a multiple input multiple output (MIMO) method has been proposed.

The MIMO method is a method of installing a plurality of antennae at transmission/reception terminals to increase a channel capacity in a given bandwidth and transmitting different transmission signals from transmission antennae. Accordingly, in comparison with a conventional single input single output (SISO) method, a data transmission rate gain and a channel capacity can be increased by the number of transmission antenna.

However, even when the MIMO method is applied, as the conventional CSMA/CA is used, all of the channels of the system cannot be utilized with optimized efficiency.

RELATED ART DOCUMENTS

Patent Document (Patent Document 1) Korean Patent Laid-open Publication No. 10-2005-0053787

(Patent Document 2) US Patent Laid-open Publication No. 2011/0002227

SUMMARY OF THE INVENTION

The present invention has been invented in order to overcome the above-described problems and it is, therefore, an object of the present invention to provide a method of operating an access point and a wireless communication system using an access point that are capable of efficiently performing high capacity and high quality wireless communication between a plurality of antennae and a plurality of terminals installed at the access point.

In accordance with one aspect of the present invention to achieve the object, there is provided a method of operating an access point, used in a method of transmitting/receiving data between the access point including a plurality of antennae and a plurality of terminals by applying order of priorities in a sequence of a real time communication service, a voice call service, a moving picture service and a data service according to a quality of service (QoS) type, the method including: classifying the terminals according to the QoS type of a service required by each of the terminals: allocating any one antenna among the plurality of antennae to one terminal of a group of terminals having the highest order of priority according to the QoS type, among the classified groups of terminals; and selecting another antenna and terminal, which maximizes a signal to interference and noise ratio (SINR) calculated from channel information between the terminal and the antenna, among the terminals and antennae, except the allocated antenna and terminal, to allocate the antenna.

Here, the channel information may be induced from test communication between the terminal and the plurality of antennae of the access point to be transmitted to the access point with the QoS type of the terminal.

In accordance with another aspect of the present invention to achieve the object, there is provided a method of operating an access point, used in a method of transmitting/receiving data between the access point including a plurality of antennae and a plurality of terminals, the method including: (a) transmitting a communication request signal including a QoS type of a service required by the terminal and channel information of the corresponding terminal with respect to the plurality of antennae of the access point from the terminal to the access point; (b) allowing the access point to determine whether the QoS type included in the communication request signal is a real time communication service or a voice call service; (c) when it is determined that the QoS type is the real time communication service or the voice call service in the step (b), determining whether the number of terminals that transmitted the communication request signal is plural; (d) when the number of terminals that transmitted the communication request signal is plural in the step (c), calculating an SINR from the channel information; (e) classifying the terminals that transmitted the communication request signal according to the QoS type; (f) selecting one terminal of the terminals belonged to the group of terminals having the highest order of priority according to the order of priority of the QoS type among the groups of terminals classified according to the QoS type in the step (e) to allocate a first antenna; and (g) selecting the terminal 100 having the largest SINR with respect to a second antenna selected from the antennae, except for the first antenna allocated in the step (e), among the plurality of antennae installed at the access point, to allocate the second antenna.

Here, the order of priority of the QoS type may be applied in a sequence of a real time communication service, a voice call service, a moving picture service, and a data service.

In addition, the channel information may be included in a preamble of data transmitted between the terminal and the access point.

Further, the step (d) may include allowing the access point to induce a channel transfer function through channel estimation from the preamble.

Furthermore, the step (d) may include allowing the access point to induce a channel matrix using the channel transfer function.

In addition, the step (d) comprises allowing the access point to substitute the channel matrix for the following equation 1 to calculate a SINR $$SINR_i = \frac{1}{\left[\left(I + \frac{1}{M_T} H^+ H\right)^{-1}\right]_i} - 1 \quad \text{[Equation 1]}$$

H is a channel matrix,
$H^+$ is a Hermitian matrix of H,
$M_T$ is the number of antennae of the access point, and
I is a unit matrix.

In accordance with another aspect of the present invention to achieve the object, there is provided a method of operating an access point, used in a method of transmitting/receiving data between the access point including a plurality of antennae and a plurality of terminals by applying order of priorities in a sequence of a real time communication service, a voice call service, a moving picture service and a data service according to a quality of service (QoS) type, the method including: classifying the terminals according to the QoS type of a service required by each of the terminals; applying a first weight to the classified groups of terminals depending on the order of priority according to the QoS type; applying a second weight according to the number of terminals belonged to each of the groups; and applying the order of priority in a sequence from a large value to a small value, in which the first weight and the second weight are multiplied, to allocate the antenna.

Here, in allocating another antenna to the terminal having the next order of priority, except the terminal to which the antenna is firstly allocated, the antenna may be selected and allocated such that an SINR calculated from channel information between the terminal and the antennae of the access point is maximized.

In addition, wherein the channel information may be induced through test communication between the terminal and the plurality of antennae of the access point to be transmitted to the access point with the QoS type of the terminal.

In accordance with another aspect of the present invention to achieve the object, there is provided a method of operating an access point, used in a method of transmitting/receiving data between the access point including a plurality of antennae and a plurality of terminals, the method including: (A) transmitting a communication request signal including a QoS type of a service required by the terminal and channel information of the corresponding terminal with respect to the plurality of antennae of the access point from the terminal to the access point; (B) allowing the access point to determine whether the QoS type included in the communication request signal is a real time communication service or a voice call service; (C) when it is determined that the QoS type is the real time communication service or the voice call service in the step (b), determining whether the number of terminals that transmitted the communication request signal is plural; (D) when the number of terminals that transmitted the communication request signal is plural in the step (c), calculating an SINR from the channel information; (E) classifying the terminals that transmitted the communication request signal according to the QoS type; (F) applying a first weight to the groups of terminals classified in the step (E) depending on order of priorities according to the QoS type, and applying a second weight according to the number of terminals belonged to each of the groups; (G) applying the order of priorities in a sequence from a large value to a small value, in which the first weight and the second weight applied in the step (F) are multiplied, to allocate a first antenna; and (H) selecting and allocating the antenna, in which the SINR is maximized, with respect to the terminal having the next order of priority, except the terminal allocated in the step (G) among the plurality of antennae installed in the access point.

Here, first weight may become larger as the order of priority is increased, and the second weight may become larger as the number of terminals belonged to the group is increased.

In accordance with another aspect of the present invention to achieve the object, there is provided a wireless communication system using an access point, employed in a system for transmitting/receiving data between the access point including a plurality of antennae and a plurality of terminals, the access point including: a reception unit connected to the antennae and configured to receive a communication request signal including a QoS type and channel information of the corresponding terminal with respect to the antennae from the terminals through the antennae; a determination unit connected to the reception unit and configured to determine whether the QoS type included in the communication request signal is a real time communication service or a voice call service and whether the number of terminals that transmitted the communication request signal is plural; a calculation unit configured to calculate an SINR using the channel information; and an antenna distribution unit configured to classify the terminals that transmitted the communication request signal according to the QoS type, allocate a first antenna, one of the antennae, to one terminal of the group of terminals having the highest order of priority according to the QoS type among the classified groups of terminals, and select another antenna and terminal such that the SINR calculated from the channel information between the terminal and the antennae is maximized, to allocate the antenna.

Here, the wireless communication system may further include a weight generating unit configured to apply a first weight to the group of terminals depending on order of priorities according to the QoS type, apply a second weight according to the number of terminals belonged to each group of terminals, and apply the order of priority in a sequence from a large value to a small value in which the first weight and the second weight are multiplied, wherein the antennae distribution unit further reflects the order of priority applied by the weight generating unit to allocate the antenna.

In addition, the first weight may become larger as the order of priority is increased, and the second weight may become larger as the number of terminals belonged to the group is increased.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, exemplary embodiments of the present invention will be described in detail. However, the present invention is not limited to the embodiments disclosed below but can be implemented in various forms. The following embodiments are described in order to enable those of ordinary skill in the art to embody and practice the present invention. To clearly describe the present invention, parts not relating to the description are omitted from the drawings. Like numerals refer to like elements throughout the description of the drawings.

Terms used herein are provided for explaining embodiments of the present invention, not limiting the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated components, motions, and/or devices, but do not preclude the presence or addition of one or more other components, motions, and/or devices thereof.

Hereinafter, configurations and operational effects of the present invention will be described in detail with reference to the accompanying drawings.

Figure 1:
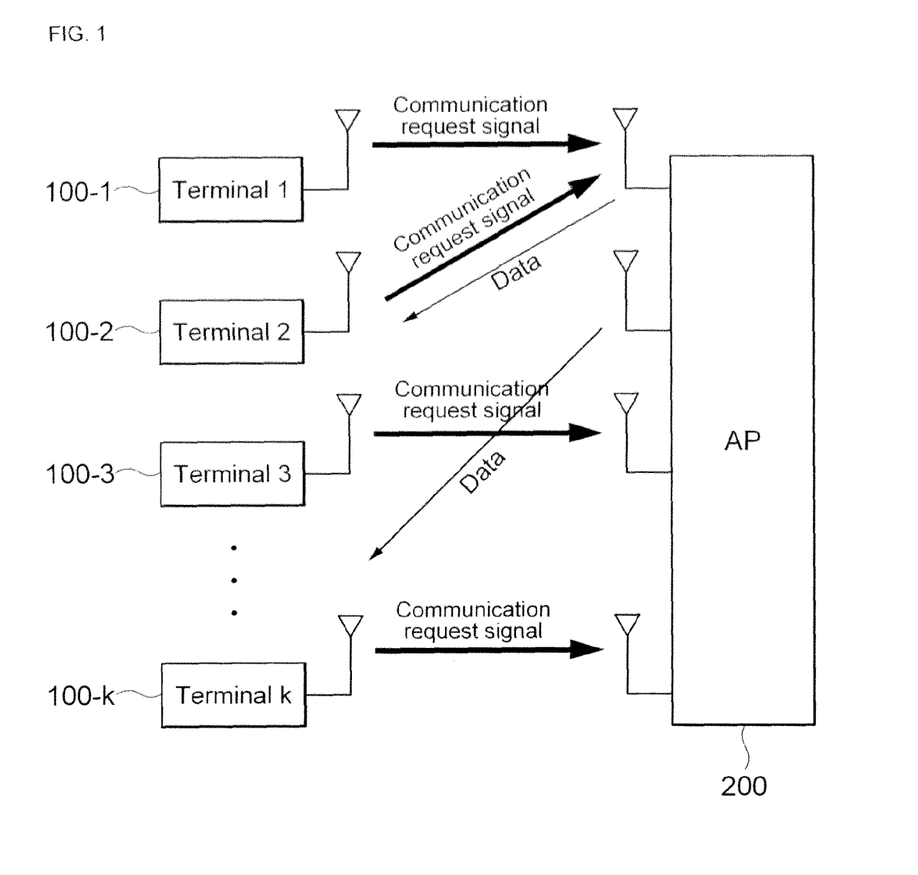
FIG. 1 is a view schematically showing a wireless communication system using an access point in accordance with an exemplary embodiment of the present invention.
Figure 2:
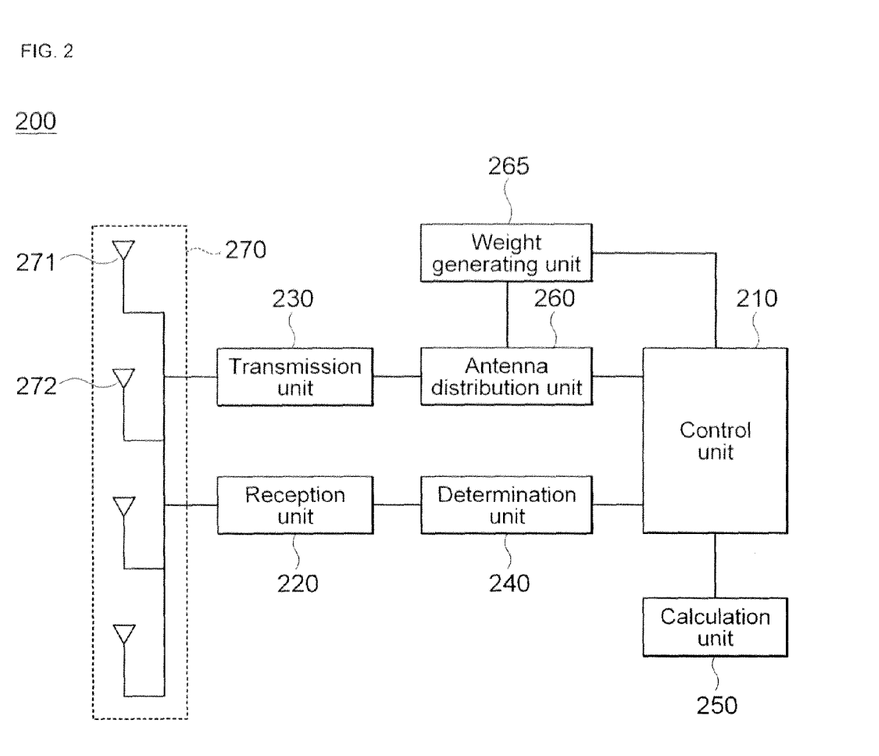
FIG. 2 is a view schematically showing major parts of the wireless communication system using the access point in accordance with an exemplary embodiment of the present invention.

FIG. 1 is a view schematically showing a wireless communication system using an access point 200 in accordance with an exemplary embodiment of the present invention, and FIG. 2 is a view schematically showing major parts of the wireless communication system using the access point 200 in accordance with an exemplary embodiment of the present invention.

Referring to FIGS. 1 and 2, the wireless communication system using the access point 200 in accordance with an exemplary embodiment of the present invention may include the access point 200 having a plurality of antennae 270, and a plurality of terminals 100.

The terminals 100 may be smart phones, tablet PCs, notebooks, computers, various computer peripheral devices, and so on, each of which can form a communication channel with at least one of the antennae 270 of the access point 200 to perform wireless communication.

Here, the terminal 100 transmits a communication request signal including a required QoS type and channel information of the terminal 100 corresponding to the antennae 270 of the access point 200 to the access point 200.

Referring to FIG. 2, the access point 200 may include a control unit 210, a reception unit 220, a transmission unit 230, a determination unit 240, a calculation unit 250, an antenna distribution unit 260, a weight generating unit, and antennae 270.

The reception unit 220 is connected to the antenna 270, and functions to receive the communication request signal received from the terminal 100.

The determination unit 240 is connected to the reception unit 220, and determines whether the QoS type included in the communication request signal received through the antenna 270 and the reception unit 220 is a real time communication service or a voice call service and whether the communication request signal is received from the plurality of terminals 100.

Here, when the QoS type included in the communication request signal is not the real time communication service or voice call service, the access point 200 may be operated in a conventional method.

In addition, even when the QoS type included in the communication request signal is the real time communication service or voice call service, if the terminal 100 to which the communication request signal was received is only one, the access point 200 may be operated in the conventional method.

The calculation unit 250 may calculate a signal to interference and noise ratio (SINR) using the channel information included in the communication request signal.

The channel information may be included in a preamble of data transmitted between the terminal 100 and the access point 200, and the access point 200 can deduce a channel transfer function using the preamble, deduce a channel matrix using the channel transfer function, and calculate the SINR using the channel matrix.

Here, a channel matrix $H_i$ may be represented as the following matrix.

$$H_i = \begin{bmatrix} h^i_{11} & \cdots & h^i_{1M_T} \\ \vdots & \ddots & \vdots \\ h^i_{M_R 1} & \cdots & h^i_{M_R M_T} \end{bmatrix} \qquad \text{[Matrix 1]}$$

Here, $h_i$ is an $i^{th}$ channel transfer function, $M_T$ is the number of antennae 270 of the access point 200, and $M_R$ is the number of terminals 100.

In addition, the SINR can be calculated by the following equation 1.

$$SINR_i = \frac{1}{\left[\left(I + \frac{1}{M_T}H^+H\right)^{-1}\right]_i} - 1 \qquad \text{[Equation 1]}$$

H is a channel matrix, $H^+$ is Hermitian matrix of H, $M_T$ is the number antennae 270 of the access point 200, and I is a unit matrix.

The antenna distribution unit 260 functions to allocate the antennae 270 to the terminals 100 using the QoS and SINR.

Specifically reviewing, the antenna distribution unit 260 classifies the terminals 100, to which the communication request signal are received, according to QoS types into groups of terminals 100, and allocates a first antenna 271, which is one of the antennae 270 of the access point 200, to one terminal 100 of the group of terminals 100 having the highest order of priority according to the QoS type.

Next, the antenna distribution unit 260 selects the other terminals 100, to which no antenna 270 is allocated, and the antenna 270 of the antennae of the access point 200 and the terminal 100, in which the SINR is maximized, to allocate the antennae 270.

Meanwhile, the wireless communication system using the access point 200 in accordance with an exemplary embodiment of the present invention may further include a weight generating unit 265 installed at the access point 200.

The weight generating unit 265 can assign a first weight to the group of terminals 100 depending on the order of priority according to the QoS type, and assigns a second weight according to the number of terminals 100 belonged to each group of terminals 100.

Here, a large value may be assigned to the first weight as the order of priority according to the QoS type becomes higher, and a large value may be assigned to the second weight as the number of terminals 100 belonged to the group becomes larger.

In addition, the order of priority allocated to the antenna 270 may be assigned in a sequence from a large value to a small value in which the first weight and the second weight are multiplied.

Further, the antenna distribution unit 260 further reflects the order of priority assigned by the weight generating unit 265 to allocate the antennae 270.

The determination unit 240, the calculation unit 250, the antenna distribution unit 260, the weight generating unit 265, and so on, may be connected to a separate control unit 210 to be controlled.

Figure 3:
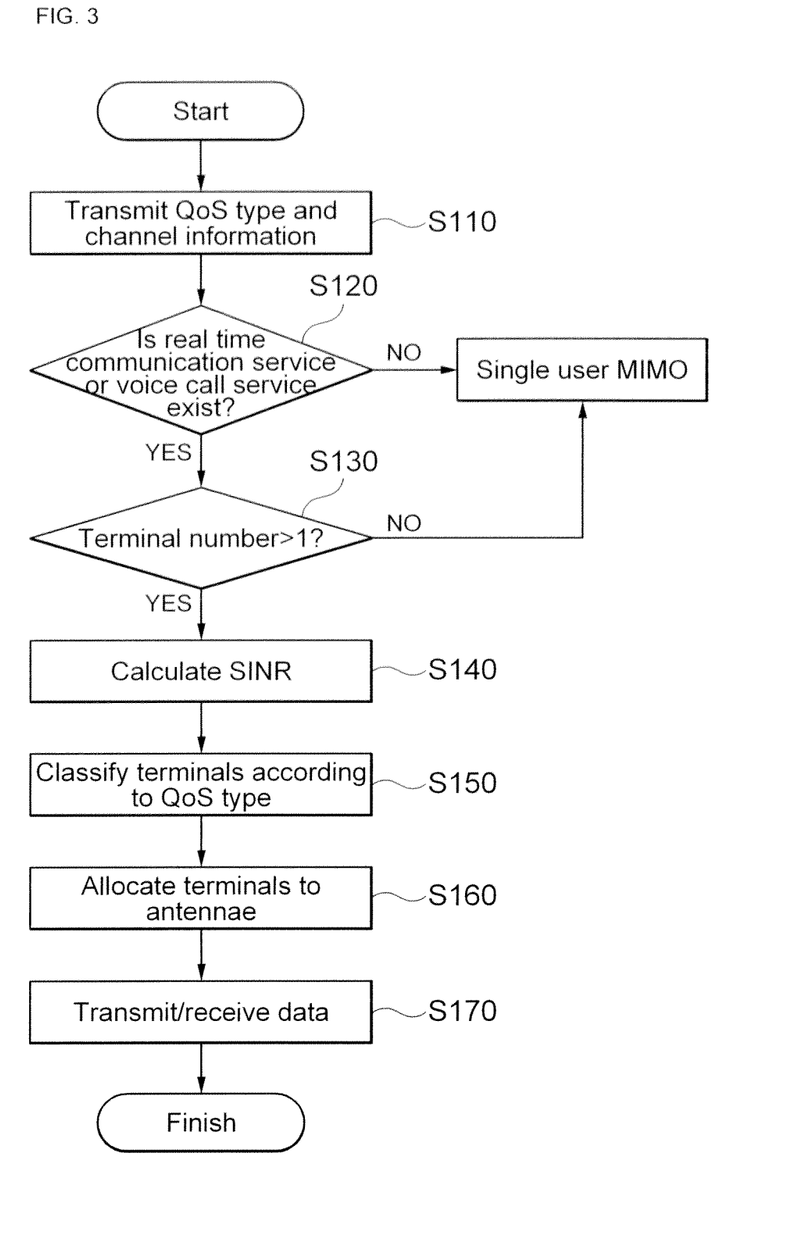
FIG. 3 is a flowchart schematically showing a method of operating an access point in accordance with an exemplary embodiment of the present invention.

FIG. 3 is a flowchart schematically showing a method of operating an access point 200 in accordance with an exemplary embodiment of the present invention.

Referring to FIG. 3, the method of operating the access point 200 in accordance with an exemplary embodiment of the present invention may include (a) transmitting a communication request signal including a QoS type of a service required by a terminal 100 and channel information of the terminal 100 corresponding to a plurality of antennae 270 of the access point 200 from the terminal 100 to the access point 200; (b) allowing the access point 200 to determine whether the QoS type included in the communication request signal is a real time communication service or a voice call service; (c) when it is determined that the QoS type is the real time communication service or the voice call service in the step (b), determining whether the number of terminals 100 that transmit the communication request signal is plural; (d) when the number of the terminals 100 that received the communication request signal in the step (c) is plural, calculating an SINR from the channel information; (e) classifying the terminals 100 that transmitted the communication request signal according to the QoS type; (f) selecting one terminal 100 from the terminal 100 belonged to the group of terminals 100 having the highest order of priority according to the order of priority of the QoS type among the groups of terminals 100 classified according to the QoS type in the step (e) to allocate a first antenna 271; and (g) selecting the terminal 100 having the largest SINR with respect to a second antenna 272 selected from the antennae 270, except for the first antenna 271 allocated in the step (e), among the plurality of antennae 270 installed at the access point 200, to allocate the second antenna 272.

First, the terminal 100 transmits the communication request signal including the QoS type and the channel information of the service, which is required by one's own, to the access point 200 (S110).

Here, the QoS type may be a real time communication service, a voice call service, a moving picture service, a data service, and so on.

In addition, the channel information may be included in a preamble of data transmitted between the terminal 100 and the access point 200, and may be used in the following SINR calculation.

Next, the access point 200 determines whether the QoS type included in the communication request signal is the real time communication service or the voice call service (S120).

Here, when the QoS type is the moving picture service or the data service, which does not require real time communication, the antennae 270 may be allocated by the conventional method to perform data transmission/reception.

Next, when the QoS type is the real time communication service or the voice call service, it is determined whether the number of terminals 100 that have sent the communication request signal is plural (S130).

Here, when the number of terminals 100 is one, the antennae 270 are allocated by the conventional method to perform data transmission/reception.

Next, when the number of terminals 100 is plural, the SINR is calculated from the channel information included in the communication request signal (S140).

Here, since the method of calculating the SINR is the same as in the description with reference to FIG. 2, overlapping description will not be repeated.

Next, the terminals 100 that transmitted the communication request signal are classified with reference to the QoS type to generate groups of the terminals 100 (S150).

Next, the antennae 270 are allocated to the terminals 100 that transmitted the communication request signal (S160).

Here, one terminal 100 of the terminals 100 belonged to the group of terminals 100 having the highest order of priority, according to the order of priority of the QoS type, among the groups of terminals 100 classified according to the QoS types, is selected to allocate a first antenna 271. Next, the terminal 100 having the maximum SINR calculated in the step S140 with respect to a second antenna 272 selected from the antennae 270, except the first antenna 271, among the plurality of antennae 270 installed in the access point 200 is selected to allocate the second antenna 272.

These processes may be repeated to allocate the antennae 270 to all of the terminals 200 that transmitted the communication request signal.

Figure 4:
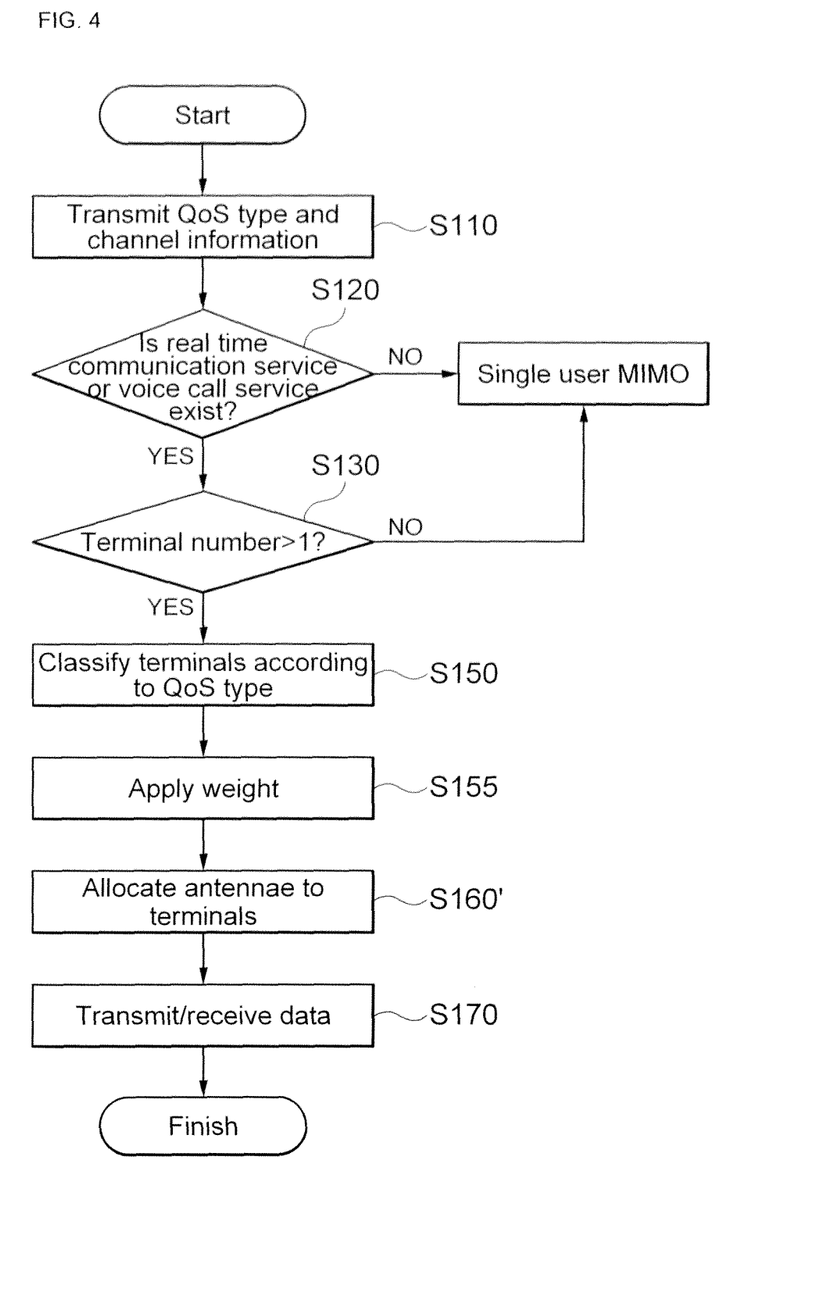
FIG. 4 is a flowchart schematically showing a method of operating an access point in accordance with another exemplary embodiment of the present invention.

FIG. 4 is a flowchart schematically showing a method of operating an access point 200 in accordance with another exemplary embodiment of the present invention.

Referring to FIG. 4, the method of operating an access point 200 in accordance with another exemplary embodiment of the present invention is a method of allocating antennae 270 using a first weight according to a QoS type and a second weight according to the number of waiting terminals.

First, since processes of transmitting a communication request signal (S110), determining whether the QoS type is a real time communication service or a voice call service (S120), determining whether the number of terminals 100 is plural (S130), and classifying the terminals 100 according to the QoS types (S150) are the same as in the above description, overlapping description will not be repeated.

Next, the first weight is applied to the order of priority according to the QoS type, and the second weight is applied according to the number of terminals 100 belonged to each group (S150).

Here, the first weight becomes larger as the order of priority according to the QoS type becomes higher, and the second weight becomes larger as the number of terminals 100 belonged to the corresponding group is increased.

Next, the order of priority is applied in a sequence from a large value to a small value, which are obtained by multiplying the first eight and the second weight, to allocate the antennae 270 (S160').

Accordingly, high capacity and high quality communication can be performed, and simultaneously, unfairness in which a certain terminal 100 is excessively on standby can be attenuated.

Figure 5:
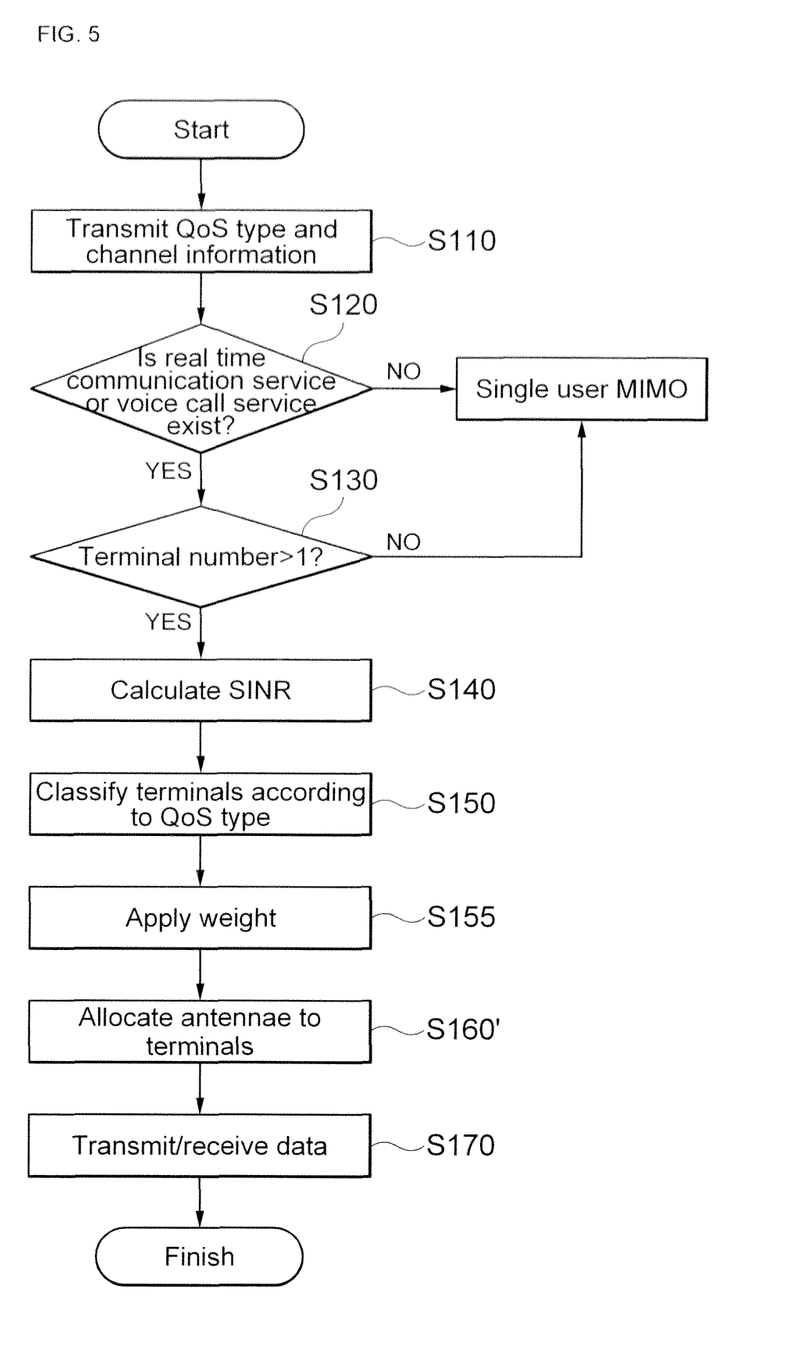
FIG. 5 is a flowchart schematically showing a method of operating an access point in accordance with still another exemplary embodiment of the present invention.

FIG. 5 is a flowchart schematically showing a method of operating an access point 200 in accordance with still another exemplary embodiment of the present invention.

Referring to FIG. 5, the method of operating an access point 200 in accordance with still another exemplary embodiment of the present invention is a method of further reflecting a SINR in allocating the antennae 270 of the embodiment described with reference to FIG. 4.

Omitting the description overlapping the embodiment described with reference to FIG. 3 and the embodiment described with reference to FIG. 4, the method of operating the access point 200 in accordance with the embodiment may be performed in a manner in which, in allocating the terminals 100 according to the antennae 270 (S160'), the antenna 270 is allocated to a certain terminal 100 according to a weight, and then, the antenna 270 having a maximum SINR with respect to the terminal 100 having the next order of priority, except for the corresponding terminal 100, is selected and allocated.

As can be seen from the foregoing, since a standby time of the terminals connected to the access point can be minimized while maintaining the conventional system guaranteeing the QoS, efficiency of the entire system can be improved.

In addition, fairness of data communication in the wireless communication system using the access point can be improved.

Embodiments of the invention have been discussed above with reference to the accompanying drawings. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention.

What is claimed is:

1. A method of operating an access point, used in a method of transmitting/receiving data between the access point including a plurality of antennae and a plurality of terminals, the method comprising:
    (a) transmitting a communication request signal including a QoS type of a service required by the terminal and channel information of the corresponding terminal with respect to the plurality of antennae of the access point from the terminal to the access point;
    (b) allowing the access point to determine whether the QoS type included in the communication request signal is a real time communication service or a voice call service;
    (c) when it is determined that the QoS type is the real time communication service or the voice call service in the step (b), determining whether the number of terminals that transmitted the communication request signal is plural;
    (d) when the number of terminals that transmitted the communication request signal is plural in the step (c), calculating an SINR from the channel information;
    (e) classifying the terminals that transmitted the communication request signal according to the QoS type;
    (f) selecting one terminal of the terminals belonged to the group of terminals having the highest order of priority according to the order of priority of the QoS type among the groups of terminals classified according to the QoS type in the step (e) to allocate a first antenna;
    (g) selecting the terminal 100 having the largest SINR with respect to a second antenna selected from the antennae, except for the first antenna allocated in the step (e), among the plurality of antennae installed at the access point, to allocate the second antenna;
    wherein the channel information is included in a preamble of data transmitted between the terminal and the access point;
    wherein the channel information is included in a preamble of data transmitted between the terminal and the access point;
    wherein the step (d) comprises allowing the access point to induce a channel transfer function through channel estimation from the preamble;
    wherein the step (d) comprises allowing the access point to induce a channel matrix using the channel transfer function; and
    wherein the step (d) comprises allowing the access point to substitute the channel matrix for the following equation to calculate a SINR:

$$SINR_i = \frac{1}{\left[\left(I + \frac{1}{M_T}H^+H\right)^{-1}\right]_i} - 1 \qquad [\text{Equation 1}]$$

wherein H is a channel matrix,
    wherein H+ is a Hermitian matrix of H,
    wherein MT is the number of antennae of the access point, and
    wherein I is a unit matrix.

2. The method of operating an access point according to claim 1, wherein the order of priority of the QoS type is applied in a sequence of a real time communication service, a voice call service, a moving picture service, and a data service.

3. A method of operating an access point, used in a method of transmitting/receiving data between the access point including a plurality of antennae and a plurality of terminals by applying order of priorities in a sequence of a real time communication service, a voice call service, a moving picture service and a data service according to a quality of service (QoS) type, the method comprising:
- classifying the terminals according to the QoS type of a service required by each of the terminals;
- applying a first weight value to the classified groups of terminals depending on the order of priority according to the QoS type;
- applying a second weight value according to the number of terminals belonged to each of the classified groups; and
- applying the order of priority in a sequence from a highest value to a lowest value, in which the first weight value and the second weight value are multiplied, to the classified groups to allocate the antenna to the terminal of the classified groups according to the order of priority.

4. The method of operating an access point according to claim 3, wherein, in allocating another antenna to the terminal having the next order of priority, except the terminal to which the antenna is firstly obtained, the antenna is selected and allocated such that an SINR calculated from channel information between the terminal and the antennae of the access point is maximized.

5. The method of operating an access point according to claim 4, wherein the channel information is induced through test communication between the terminal and the plurality of antennae of the access point to be transmitted to the access point with the QoS type of the terminal.

6. A method of operating an access point, used in a method of transmitting/receiving data between the access point including a plurality of antennae and a plurality of terminals, the method comprising:
- (A) transmitting a communication request signal including a QoS type of a service required by the terminal and channel information of the corresponding terminal with respect to the plurality of antennae of the access point from the terminal to the access point;
- (B) allowing the access point to determine whether the QoS type included in the communication request signal is a real time communication service or a voice call service;
- (C) when it is determined that the QoS type is the real time communication service or the voice call service in the step (b), determining whether the number of terminals that transmitted the communication request signal is plural;
- (D) when the number of terminals that transmitted the communication request signal is plural in the step (c), calculating an SINR from the channel information;
- (E) classifying the terminals that transmitted the communication request signal according to the QoS type;
- (F) applying a first weight value to the groups of terminals classified in the step (E) depending on order of priorities according to the QoS type, and applying a second weight value according to the number of terminals belonged to each of the groups;
- (G) applying the order of priorities in a sequence from a highest value to a lowest value, in which the first weight value and the second weight value applied in the step (F) are multiplied, to the classified groups to allocate a first antenna; and
- (H) selecting and allocating the antenna, in which the SINR is maximized, with respect to the terminal having the next order of priority, except the terminal allocated in the step (G) among the plurality of antennae installed in the access point.

7. The method of operating an access point according to claim 6, wherein the first weight value becomes larger as the order of priority is increased, and the second weight value becomes larger as the number of terminals belonged to the group is increased.

8. A wireless communication system using an access point, employed in a system for transmitting/receiving data between the access point including a plurality of antennae and a plurality of terminals, the access point comprising:
- a reception unit connected to the antennae and configured to receive a communication request signal including a QoS type and channel information of the corresponding terminal with respect to the antennae from the terminals through the antennae;
- a determination unit connected to the reception unit and configured to determine whether the QoS type included in the communication request signal is a real time communication service or a voice call service and whether the number of terminals that transmitted the communication request signal is plural;
- a calculation unit configured to calculate an SINR using the channel information;
- an antenna distribution unit configured to classify the terminals that transmitted the communication request signal according to the QoS type, allocate a first antenna, one of the antennae, to one terminal of the group of terminals having the highest order of priority according to the QoS type among the classified groups of terminals, and select another antenna and terminal such that the SINR calculated from the channel information between the terminal and the antennae is maximized, to allocate the antenna; and
- a weight generating unit configured to apply a first weight value to the group of terminals depending on order of priorities according to the QoS type, apply a second weight value according to the number of terminals belonged to each group of terminals, and apply the order of priority in a sequence from a highest value to a lowest value in which the first weight value and the second weight value are multiplied,
- wherein the antennae distribution unit further reflects the order of priority applied by the weight generating unit to allocate the antenna.

9. The wireless communication system using an access point according to claim 8, wherein the first weight value becomes larger as the order of priority is increased, and the second weight value becomes larger as the number of terminals belonged to the group is increased.

* * * * *